July 12, 1949.　　　　　A. J. PETERSON　　　　　2,475,986
FILTER UNIT FOR COFFEE MAKERS
Filed Sept. 22, 1944　　　　　　　　　　　　　　2 Sheets-Sheet 1
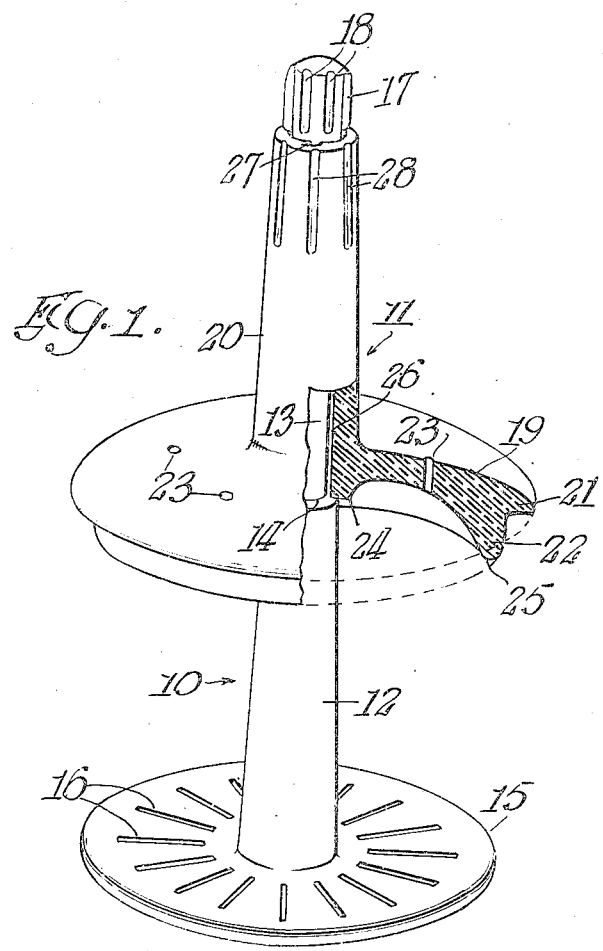
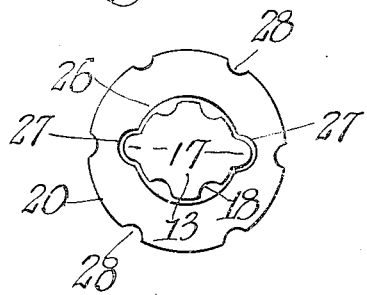
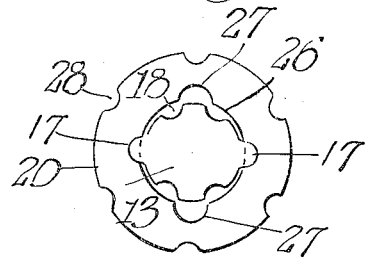
Inventor
Amos J. Peterson

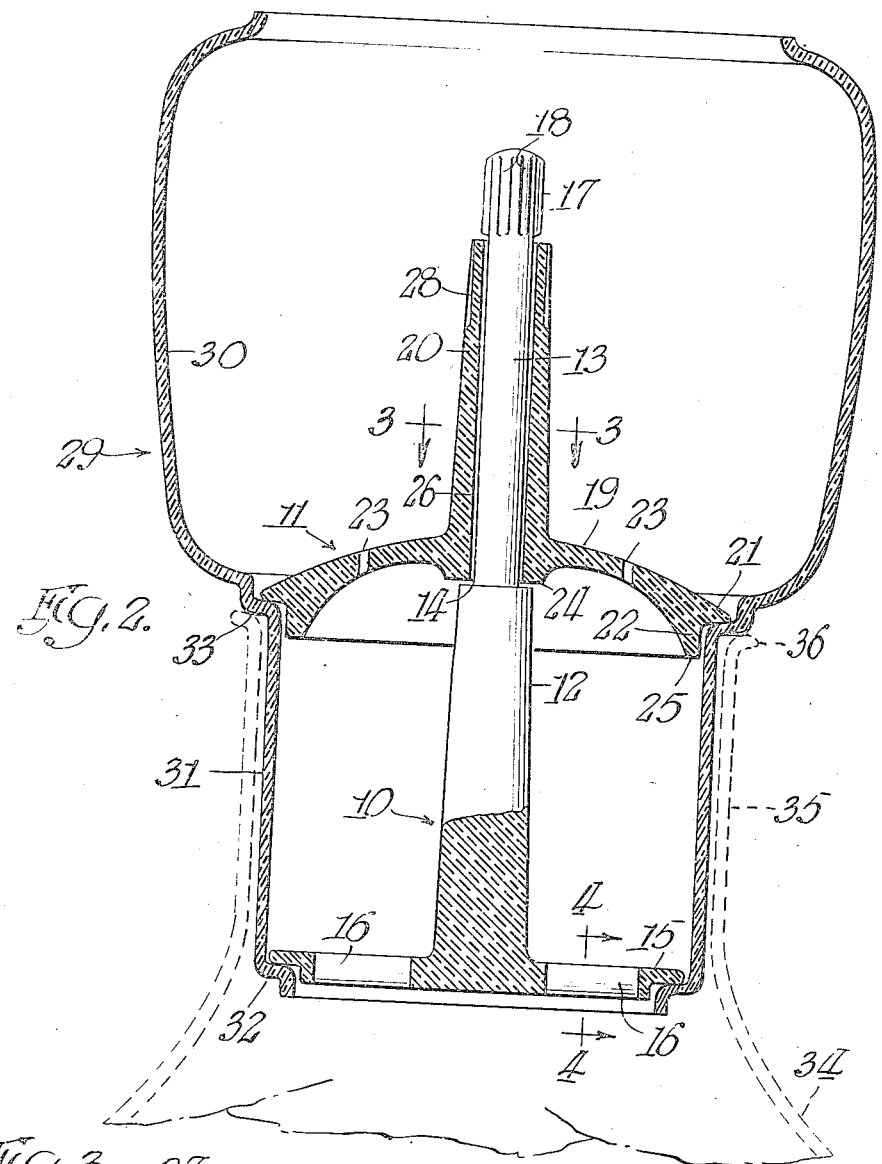

Patented July 12, 1949

2,475,986

UNITED STATES PATENT OFFICE 2,475,986

FILTER UNIT FOR COFFEE MAKERS

Amos J. Peterson, Berwyn, Ill., assignor to Club Aluminum Products Co., Chicago, Ill., a corporation of Delaware Application September 22, 1944, Serial No. 555,233

1 Claim. (Cl. 99—306)

This invention relates to improvements in filter units for drip coffee makers and it consists of the matters hereinafter described and more particularly pointed out in the appended claim.

One of the objects of the present invention is to provide a filter unit of the kind mentioned, which includes but two parts that may be readily assembled for use and then disassembled after such use for an easy but thorough cleaning and whereby the unit may be kept in a sanitary condition.

Another object of the invention is to provide a unit of this kind which includes a filter part and a water distributor part which may be readily applied to and removed from the filter part by a simple relative turning and longitudinal movement between said parts.

A further object of the invention is to provide a unit of this kind which is so constructed as to be practical to make of a ceramic, plastic, or other moldable material and which may be conveniently handled in removing the same from the associated vessel of the coffee maker.

The above mentioned objects of the invention, together with others, will more fully appear as the specification proceeds.

In the drawings:

Fig. 1 is a perspective view, on a full size scale, of a filter unit for a drip coffee maker embodying the preferred form of the invention, with one of the parts thereof appearing partly in section for better illustrative purposes.

Fig. 2 is a view, on the scale of Fig. 1, partly in elevation and partly in longitudinal section of the improved filter unit when in operative position in the associated upper vessel of a drip coffee maker.

Fig. 3 is a horizontal detail sectional view through a part of the improved filter unit as taken on the line 3—3 and on a scale enlarged over that of Fig. 2.

Fig. 4 is a detail vertical sectional view through a part of the improved filter unit as taken on the line 4—4 of Fig. 2 and on the scale of Fig. 3.

Fig. 5 is a top plan view, on the scale of Fig. 3, of the top end portion of the unit, with one part arranged in a position relatively to the other for an assembly of said parts or for a disassembly thereof by a relative longitudinal movement.

Fig. 6 is a view similar to Fig. 5, after the parts thereof have been turned relatively into positions preventing longitudinal separation of said parts.

In general the improved filter unit is made in two parts for assembly into operative position in the upper vessel of a drip coffee maker and wherein one of said parts supports the ground coffee in place in said vessel and the other distributes or spreads the water in said vessel evenly over said ground coffee to insure the production of a good and flavorful infusion in the lower vessel of the coffee maker.

In the use of the unit, in a drip coffee maker, one part thereof is placed in position in the coffee chamber of the upper vessel of the coffee maker, to provide a filter bottom therefor. After the ground coffee has been placed thereon, the other part is applied to the first part to act as a means for distributing the water over the ground coffee and at the same time prevent the ground coffee from floating up into the water chamber of said upper vessel. After a coffee infusion has been made in the lower vessel of the coffee maker, said parts are removable therefrom as a unit while supporting the wet coffee grounds as a mass for disposal after which said parts may be separated for cleaning. It is desired that when the unit is in use there be a limited longitudinal floating movement between said parts and therefore they are so made that in one relative position their movement is limited. When turned to a different relative position, complete separation of the parts is possible.

Referring now in detail to that embodiment of the invention illustrated in the drawings and especially to Fig. 1 thereof, the improved filter comprises a lower filter part 10 and an upper water distributor part 11, each of which is preferably made of a moldable material such as a ceramic, a glass or a plastic, a ceramic material being preferred.

The filter part includes a stem having lower and upper portions 12 and 13 respectively, the lower portion tapering upwardly and the upper portion being cylindrical and somewhat longer and of a diameter less than that of the top end of the lower portion and to which it is joined by a radial shoulder 14. Integral with the bottom end of the lower portion is a flat and preferably circular filter disc 15, having radially extending filter slits 16 therein. Said slits, where they open through the top surface of the filter disc, are so narrow relative to the "grind" of coffee to be used in the associated drip coffee maker as to preclude the passage of the ground coffee therethrough. These slits flare downwardly and outwardly to open through the bottom of the disc 15 where they are so wide as to prevent drops of water adhering to the disc through the action of capillary attraction. This formation of said slits best appears in Fig. 4. At the top end of the upper stem portion 13 is a plurality of relatively short, longitudinally extending ribs 17 which in the present instance are two in number and which are arranged diametrically opposite each other. In the periphery of said top end of the upper stem portion are longitudinally extending grooves or flutes 18—18 which coact with said ribs in forming a convenient knob for grasping by the fingers of the hand. The ribs 17—17 project radially outward beyond the periphery of the stem portion 13 and their function will soon appear.

The water distributor 11 includes a shallow circular dome shaped body 19 and an upstanding centrally disposed tubular stem 20. The body 19, which is of a diameter greater than that of the disc 15, terminates in a peripheral radial flange 21 and depending from the underside of said body is an annular flange 22 of a diameter approximating that of the disc 15. In the body 19 between the stem 20 and flange 21 is a plurality of water passages 23—23 of such relatively small diameter as to prevent the too rapid passage of water therethrough. The bottom surface of the body is convexed outwardly and downwardly from an annular boss 24 so as to blend into the flange 22 as a rounded corner 25.

The stem 20 has an internal bore 26 of a diameter slightly greater than the stem portion 13 with which it is associated. In opposite sides of said bore are longitudinal grooves 27 that are complemental to the ribs 17 on the top end of the stem portion 13. The stem 20 in connection with the boss 24 provides a length that approximates that part of the stem portion between the shoulder 14 and the bottom ends of the ribs 17—17. Said stem 20 tapers externally slightly toward its top end where it is provided with longitudinal grooves or flutes 28 which give good grasping quality for the fingers in handling and manipulating the water distributor when the unit as a whole is placed in the upper vessel 29 of a drip coffee maker such as appears in Fig. 2.

The vessel 29 as herein shown and which is usually made of glass, includes an open top bowl-like upper portion 30 and a cylindrical lower ground coffee holding portion 31. The bottom end of the portion 31, which is also open, terminates in a flange that forms an inwardly extending shoulder 32. The upper end of said portion joins the bowl 30 in a manner providing an annular shoulder 33. The coffee holding portion 31 has an inside diameter slightly greater than that of the filter disc 15 and the shoulder 33 has a diameter slightly greater than that of the peripheral flange 21 of the body 19 of the water distributor. This said coffee holding portion is adapted for use in connection with a glass coffee infusion vessel 34 shown in dotted lines in Fig. 2. This vessel 34 has a top end neck 35 of a length and diameter to receive the coffee holding portion 31 of the vessel 29, said neck terminating in a top end pouring lip flange 36 and upon which the shoulder 33 seats when said vessels are disposed in operative relation to each other.

In making a coffee infusion with the filter unit and vessels above mentioned, while the parts 10 and 11 are in a separated condition, the top end of the stem portion 13 is grasped by the fingers and the part 10 as a whole is lowered through the open top end of the vessel 29 and into the lower portion 31 until the peripheral margin of the filter disc 15 rests in supporting relation upon the shoulder 32. The stem portions 12 and 13 are of such a combined length as to dispose the top end of the portion 13 in convenient relation to the open top end of the vessel 29. The filter unit part 10 may be placed in the vessel 29 either after or before (preferably the latter) the vessel 29 has been applied to the vessel 34.

Ground coffee is then placed in the vessel part 31 to a level proportioned to the amount of hot water later placed in the portion 30 of the vessel 29, the filter disc 15 forming at this time a supporting bottom for the ground coffee.

The water distributor part 11 is now grasped by its fluted top end and placed in position with respect to the top end of the stem part 13 as to be substantially coaxial therewith. The distributor is then turned axially until the grooves 27 of its bore 26 line up with the ribs 17—17 as best appears in Fig. 5. This permits the lowering of the distributor upon the stem portion 13 until the flange 21 engages in supporting relation upon the inside of the shoulder 33 of the vessel 29. When so disposed, the bottom end of the boss 24 of the distributor will be spaced slightly above the shoulder 14 between the stem parts 12 and 13, as best appears in Fig. 2. By means of the fingers grasping the fluted top end of the stem 20, the distributor part 11 as a whole is turned relatively to the filter part 10 so that the grooves 27 are out of register or line with the ribs 17—17 as best appears in Fig. 6.

Water in the proper amount, at the desired temperature, is now poured into the open top end of the vessel 29 to the desired level therein. This water then passes down through the passages 23 and ground coffee supported by the disc 15, picking up the valuable constituents therefrom to pass out through the slits 16 in the disc to drip into the vessel 34 as a coffee infusion.

After the coffee infusion has ceased dripping from the slits in the filter disc, the filter unit and the vessel 29 may be removed as a whole from the vessel 34 which may now be used as a serving vessel. The spent coffee grounds at this time form a relatively wet and packed mass on the filter disc.

To remove the filter unit from the vessel 29, the fluted top end part of the stem portion 13 is grasped as a knob and an upward lift imparted to the unit to remove the same, together with the wet packed grounds, out through the open top end of the vessel. In the initial part of said lift the shoulder 14 at the junction of the stem parts 12 and 13 will engage the boss 24 of the distributor 11 which will then be lifted upwardly with the filter part 10.

The wet coffee grounds are now dislodged from the unit for disposal. Thereafter the distributor part 11 is turned relatively to the filter part 10 until the grooves 27 register with the ribs 17 as shown in Fig. 5 so that the distributor may be withdrawn upwardly from the filter part. Said parts may now be individually cleansed and sterilized. For convenient storage, the parts 10 and 11 may be reassembled.

It is to be noted that the parts may be readily assembled and disassembled by a simple relative turning and longitudinal movement and when disassembled may be readily cleansed.

While in describing the invention I have referred in detail to the form, arrangement and construction of the parts involved, the same is to be considered only in the illustrative sense so that I do not wish to be limited thereto except as may be specifically set forth in the appended claim.

I claim as my invention:

In combination with the upper vessel of a drip coffee maker that is removably engaged upon a coacting lower vessel thereof, said upper vessel including a lower ground coffee chamber and an upper and communicating water receiving chamber, said coffee chamber including an inwardly extending bottom end shoulder, a filter unit associated with the upper vessel of said coffee maker and comprising a plurality of longitudinally separable parts, one of said parts including a filter portion adapted to supportingly engage said shoulder and an upstanding central stem having a lower portion of one diameter and an upper portion of a lesser diameter, said portions being connected together by a radial shoulder, the upper portion being formed as a grasping knob and which has at least one longitudinally extending rib, the other part of said filter unit including a lower portion with water passages therethrough for closing off the upper portion of said ground coffee chamber and a sleeve to surround at least a part of said upper portion of said stem, said sleeve having at least one longitudinal internal groove complemental to said rib on said knob to permit the application of said distributor to the upper portion of said stem.

AMOS J. PETERSON.

REFERENCES CITED

The following references are of record in the file of this patent:

UNITED STATES PATENTS

| Number | Name | Date |
|---|---|---|
| 101,336 | Williams | Mar. 29, 1870 |
| 748,910 | Acker | Jan. 5, 1904 |
| 1,015,407 | Selg | Jan. 23, 1912 |
| 1,018,337 | Petry | Feb. 20, 1912 |
| 1,389,299 | Gardiner | Aug. 30, 1921 |
| 1,472,901 | Brenner et al. | Nov. 6, 1923 |
| 2,069,939 | Browning | Feb. 9, 1937 |
| 2,285,930 | Kahan | June 9, 1942 |
| 2,313,761 | McMenamin | Mar. 16, 1943 |
| 2,314,543 | Kopf | Mar. 23, 1943 |
| 2,387,322 | Francis | Oct. 23, 1945 |